US007307978B2

(12) United States Patent
Carlson

(10) Patent No.: US 7,307,978 B2
(45) Date of Patent: Dec. 11, 2007

(54) METHOD AND SYSTEM FOR ROUTING PACKETS THROUGH A NETWORK BY EMPLOYING GEOGRAPHICAL POSITION DATA

(75) Inventor: Greg Carlson, Corvallis, OR (US)

(73) Assignee: Avago Technologies Enterprise IP (Singapore) Pte Ltd, Singapore (SG)

( * ) Notice: Subject to any disclaimer, the term of this patent is extended or adjusted under 35 U.S.C. 154(b) by 1227 days.

(21) Appl. No.: 09/847,765

(22) Filed: May 1, 2001

(65) Prior Publication Data

US 2002/0163912 A1 Nov. 7, 2002

(51) Int. Cl.
H04J 3/24 (2006.01)

(52) U.S. Cl. ...................................... 370/349; 370/328

(58) Field of Classification Search ................ 370/235, 370/238, 248, 253, 255, 310, 310.1, 310.2, 370/328, 338, 386, 389, 392, 349, 400, 401, 370/402, 316, 411, 395.31, 395.32, 351, 410; 342/458; 455/456; 709/227, 228, 237
See application file for complete search history.

(56) References Cited

U.S. PATENT DOCUMENTS

| | | | | |
|---|---|---|---|---|
| 5,987,011 | A * | 11/1999 | Toh | ............................ 370/331 |
| 6,584,307 | B1 * | 6/2003 | Antonucci et al. | ....... 455/422.1 |
| 6,721,537 | B1 | 4/2004 | Briesemeister | |
| 6,816,460 | B1 * | 11/2004 | Ahmed et al. | .............. 370/238 |
| 6,954,790 | B2 * | 10/2005 | Forslow | ..................... 709/227 |

FOREIGN PATENT DOCUMENTS

WO  WO 99/46899  9/1999

OTHER PUBLICATIONS

Rahul Jain et al, "Geographical Routing Using Partial Information for Wireless Ad Hoc Networks", Feb. 2001, IEEE Personal Communications.*
Konstantinos N. Amouris et al, A Position-based multi-zone routing protocol for wide area mobile ad-hoc network,1999 IEEE.*
Neighbor discovery and stateless autoconfiguration in IPv6, Narten, T., IEEE Internet Computing, vol. 3, Issue: 4, Jul.-Aug. 1999, pp. 54-62.
IP-centric control and management of optical transport networks, Bernstein, G.M.; Yates, J.; Saha, D., IEEE Communications Magazine, vol. 38, Issue: 10, Oct. 2000, pp. 161-167.
Simulation of adaptive statistically multiplexed routing in ad hoc networks, Dattatreya, G.R.; Kulkarni, S.S.; Wireless Communications and Networking Conference 1999, WCNC 1999, IEEE 1999, pp. 933-937 vol. 2.
A resource reservation mechanism for mobile nodes in the Internet, Das, S.K.; Jayaram, R.; Kakani, N.K.; Sen, S.K., Vehicular Technology Conference, 1999 IEEE 49th, vol. 3, 1999, pp.1940-1944.
Comparative analysis of neighbor greeting protocols: ARP versus ES-IS, McDonald, B.; Znati, T., Simulation Symposium 1996, Proceedings of the 29th Annual, 1996, pp. 71-80.
Proxy PNNI augmented routing (proxy PAR), Przygienda, T.; Droz, P.; West, C., ATM, 1998. ICATM-98, 1st IEEE International Conference, 1998, pp. 371-377.

* cited by examiner

Primary Examiner—Brenda Pham

(57) ABSTRACT

A geographic position dependent routing method and system for ad hoc networks, where are least one of the nodes of the ad hoc network can change its location. A position determination module is provided for determining the position of the current node. A communication mechanism is provided for communicating messages with other nodes in the ad hoc network. A geographic position dependent routing mechanism is coupled to the position determination module and communication mechanism for receiving messages, the position of the current node, and based thereon for one of transmitting the message and discarding the message.

18 Claims, 7 Drawing Sheets

METHOD AND SYSTEM FOR ROUTING PACKETS THROUGH A NETWORK BY EMPLOYING GEOGRAPHICAL POSITION DATA

FIELD OF THE INVENTION

The present invention relates generally to networks, and more particularly, to a method and system for routing packets through a network by employing geographical position data.

BACKGROUND OF THE INVENTION

Networks have a plurality of nodes that can, for example, be a network device, such as a router or a switch. A packet is transmitted from a source node to a destination through one or more paths defined by the nodes between the source node and the destination node. Each node performs neighborhood discovery (also referred to as network discovery) to create a map of the network. The network map can, for example, identify those nodes that are connected to the current node. The current node can then use the network map to build a database (e.g., routing table) for use in deciding which node(s) to forward or route any received message. These routing tables are generally static in nature and are typically only updated daily.

There are several disadvantages of this prior art approach. First, the neighborhood discovery process is a time consuming process. Second, neighborhood discovery process consumes network bandwidth in order to implement. Third, neighborhood discovery process may not be suitable or adequate for a network, where one or more of the nodes are mobile, as described in greater detail herein after.

With the proliferation of mobile devices (e.g., cellular telephones, laptop computers, personal digital assistants), some have proposed the use of these mobile devices as nodes of an ad hoc network (i.e., a network that is constantly changing as mobile units enter or exit a particular region of interest). As can be appreciated, static network maps and routing tables provide an inadequate solution for an ad hoc network, where the nodes are not stationary.

Consequently, it is desirable for there to be a mechanism that can intelligently route packets in a network having a plurality of nodes, where the nodes may move and change their position, without the use of routing tables and network discovery.

Based on the foregoing, there remains a need for a method and system for routing packets by employing geographical position data that overcomes the disadvantages set forth previously.

SUMMARY OF THE INVENTION

According to one embodiment of the present invention, a geographic position dependent routing system for ad hoc networks, where are least one of the nodes of the ad hoc network can change its location is provided. A position determination module is provided for determining the position of the current node. A communication mechanism is provided for communicating messages with other nodes in the ad hoc network. A geographic position dependent routing mechanism is coupled to the position determination module and communication mechanism for receiving messages, the position of the current node, and based thereon for one of transmitting the message and discarding the message.

According to another embodiment of the present invention, a geographic position dependent routing method for ad hoc networks, where are least one of the nodes of the ad hoc network can change its location is provided. The current node receives a message. A determination is made whether the received message has been encountered recently. When the received message has been encountered recently, the message is discarded. When the received message has not been encountered recently, a determination is made whether the current node is the destination of the message. When the current node is the destination of the message, the current node processes the message. When the current node is not the destination of the message, the message is selectively forwarded to another node in the network in an intelligent manner that employs the geographic position data of the current node.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE PREFERRED EMBODIMENT

A geographic position dependent routing method and system are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The present invention provides a method and system for by employing geographic position data for routing through an ad hoc network (hereinafter also referred to as a geographic position dependent routing (GPDR) method and system. An ad hoc network is a network where one or more of the nodes therein can move or change its geographic position. An ad hoc network can include any network where a neighborhood discovery process is inadequate because the network configuration changes more rapidly than the routing tables can be revised accordingly to reflect such network changes.

Network 100

Figure 1:
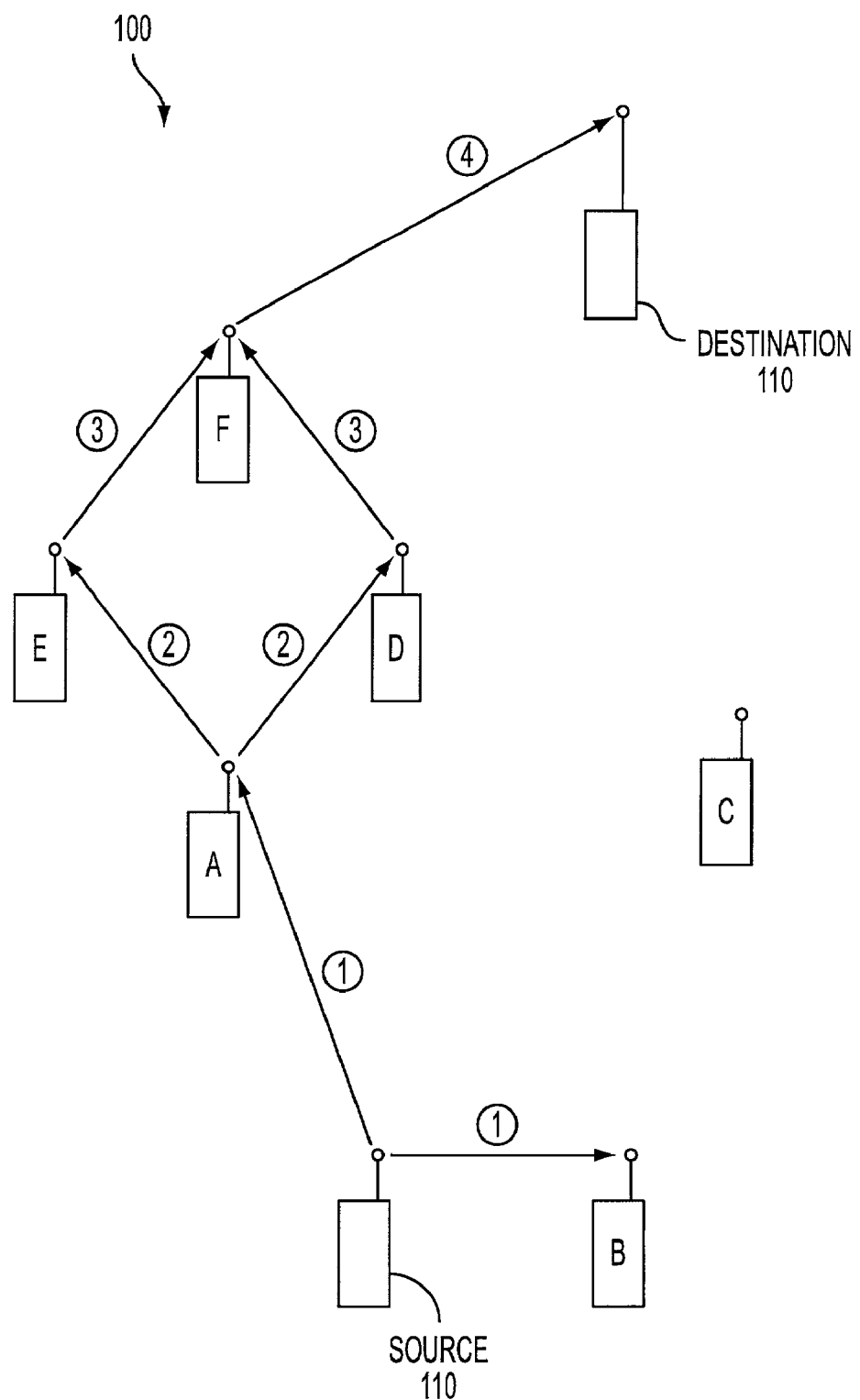
FIG. 1 is a block diagram illustrating an exemplary network in which the geographic position dependent routing method and system of the present invention can be implemented.

FIG. 1 illustrates an ad network 100 in which the geographic position dependent routing (GPDR) method and system of the present invention can be implemented. An ad hoc network 100 is a network where one or more of the nodes therein can move or change its geographic position. The ad hoc network 100 can include any network where the neighborhood discovery process is inadequate because the network configuration changes more rapidly than the routing tables can be revised to reflect such network changes.

The network 100 includes a plurality of nodes 110 (e.g., node A, node B, node C, node D, node E, node F, a source node (SRC node), and a destination node (DEST node). Each node can be, for example, a mobile device, such as a cellular telephone, a personal digital assistant (PDA), or a laptop computer.

Figure 6:
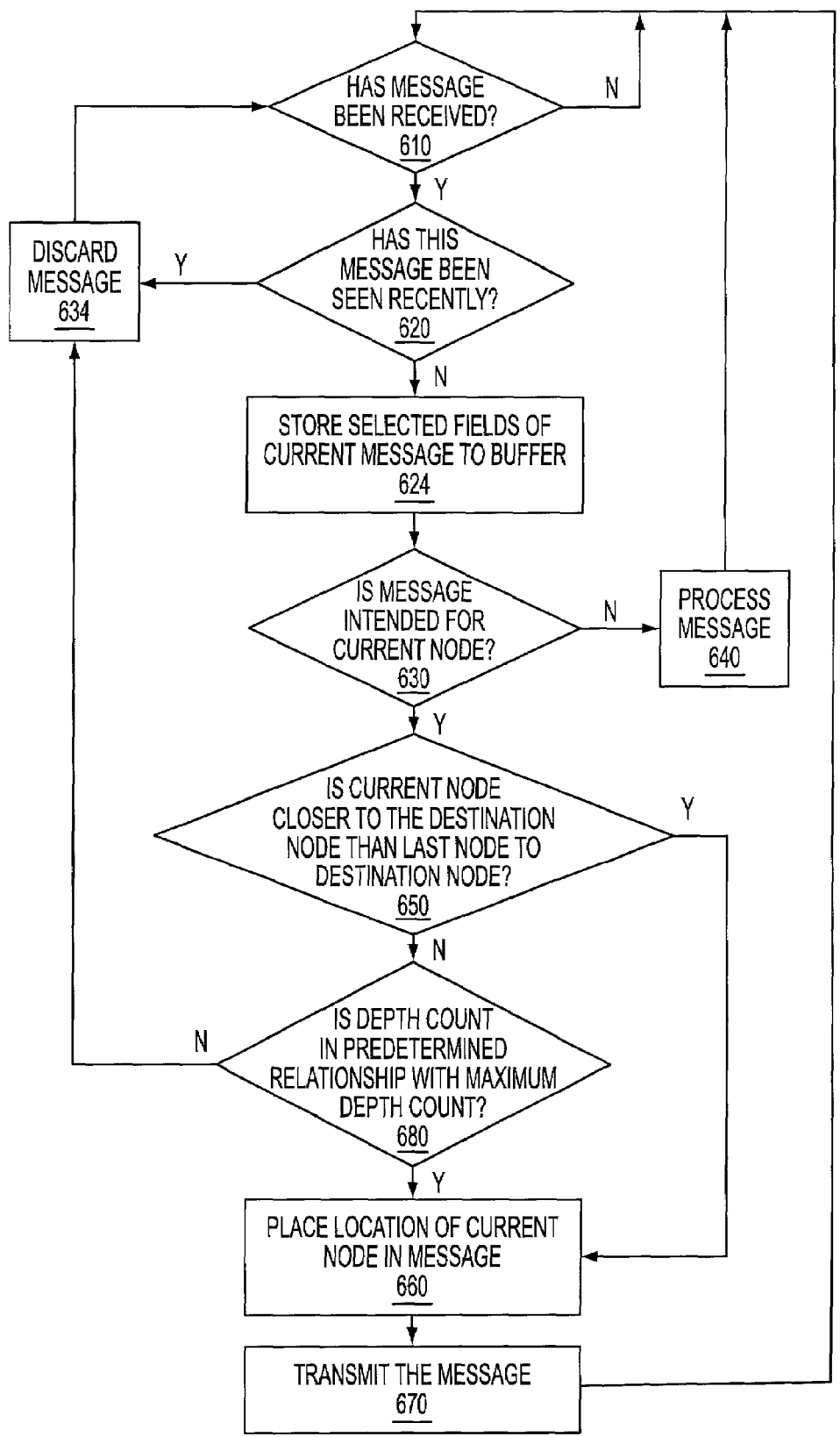
FIG. 6 is a flowchart illustrating the processing steps performed by the geographic position dependent routing mechanism of FIG. 2.

The SRC node broadcasts a message (e.g., a packet of information) to node A and node B. Node B can re-broadcast the message to the SRC node. However, in this example, node C is outside of the transmitting range from node B so node C does not receive the rebroadcast message. At each node, packet processing that is described in greater detail with reference to FIG. 6 is performed.

It is noted that there are a number of different mechanisms that could be employed to initially discover the geographic position of the destination node. One such mechanism is to broadcast a location query throughout the entire network. For example, a message with the destination field of (0,0,0) can indicate such a location query. If the destination node is available and reachable, the destination node responds with its position information. At that point, both the source node and the destination node have the geographic position of the other one and can start communicating as described in accordance with the teachings of the present invention.

Other network discovery schemes are described in the following publications:

1) Neighbor discovery and stateless autoconfiguration in IPv6, Narten, T., IEEE Internet Computing, Volume: 3, Issue: 4, July-August 1999, Page(s): 54-62;

2) IP-centric control and management of optical transport networks, Bernstein, G. M.; Yates, J.; Saha, D., IEEE Communications Magazine, Volume: 38, Issue: 10, October 2000, Page(s): 161-167;

3) Simulation of adaptive statistically multiplexed routing in ad hoc networks, Dattatreya, G. R.; Kulkarni, S. S.; Wireless Communications and Networking Conference 1999, WCNC 1999, IEEE 1999, Page(s): 933-937 vol.2;

4) A resource reservation mechanism for mobile nodes in the Internet, Das, S. K.; Jayaram, R.; Kakani, N. K.; Sen, S. K., Vehicular Technology Conference, 1999 IEEE 49th, Volume: 3, 1999, Page(s): 1940-1944;

5) Comparative analysis of neighbor greeting protocols: ARP versus ES-IS, McDonald, B.; Znati, T., Simulation Symposium 1996, Proceedings of the 29th Annual, 1996, Page(s): 71-80; and 6) Proxy PNNI augmented routing (proxy PAR), Przygienda, T.; Droz, P.; West, C., ATM, 1998. ICATM-98, 1st IEEE International Conference, 1998, Page(s): 371-377.

Node

Figure 2:
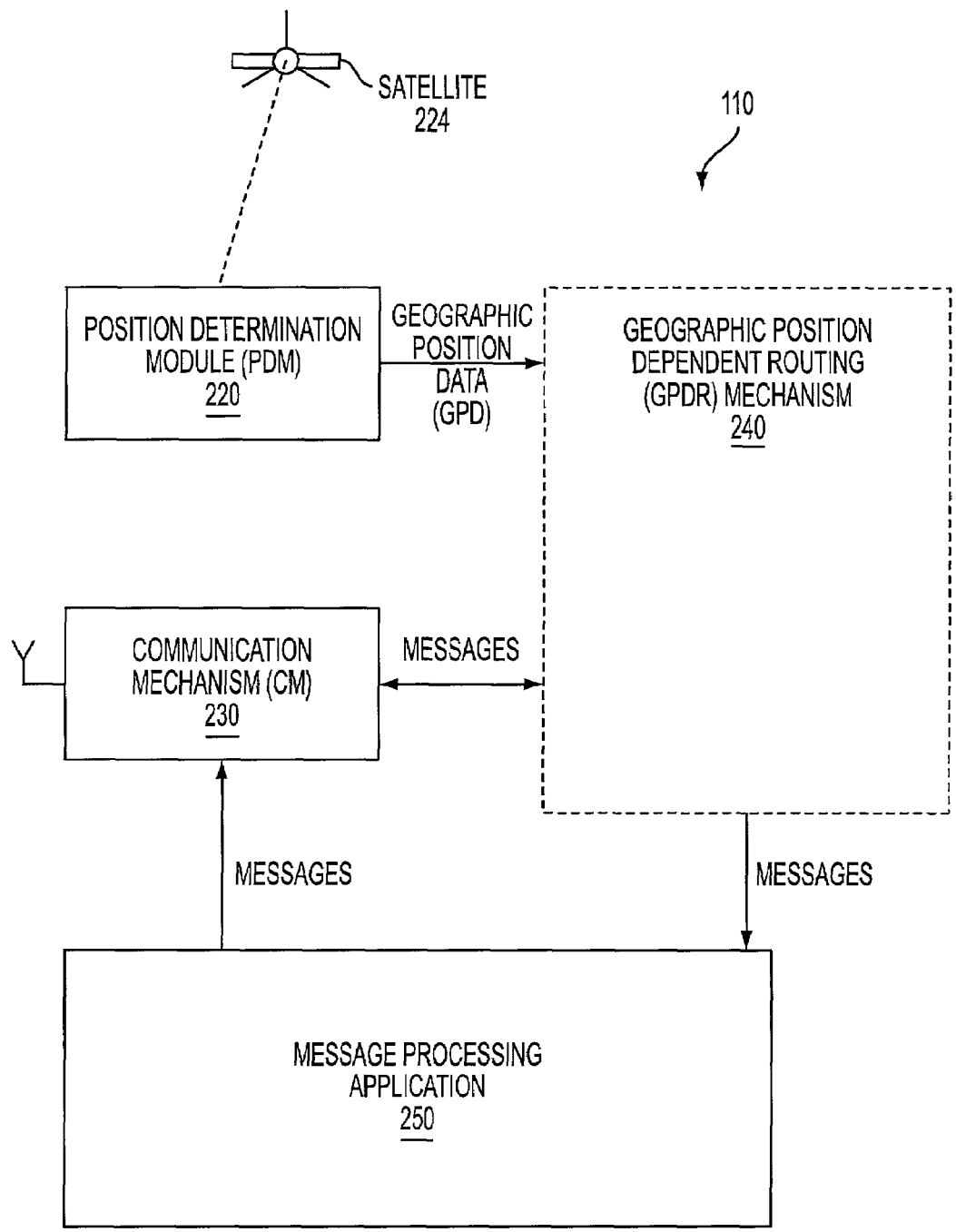
FIG. 2 illustrates in greater detail a node in the ad hoc network of FIG. 1 according to one embodiment of the present invention.

FIG. 2 illustrates in greater detail a node 110 in the ad hoc network of FIG. 1. Each node 110 includes a position determination module (PDM) 220 for determining the geographic position data (GPD) of one or more nodes 110 in the network 100 and providing the GPD to the geographic position dependent routing (GPDR) mechanism 240 of the present invention. For example, the PDM 220 can be employed to determine the position (e.g., the latitude, longitude, and altitude of a current node).

The position determination module 220 can be any position determination mechanism, such as a global positioning satellite (GPS) system and network-assisted position determination techniques.

A global positioning satellite (GPS) system can use satellites (e.g., satellite 224) to provide geographic position data (GPD) to the GPDR mechanism 240 of the present invention.

An example of a network-assisted position determination technique is a method that employs time of arrival triangulation from three or more base stations to determine position of a node. Other techniques use signal strength and other factors to determine position of the node. Position determination techniques are generally well known to those of ordinary skill in the art. For further information regarding GPS, please refer to Interface Control Document (ICD-GPS-200).

Each node 110 also includes a communication mechanism (CM) 230 for communicating with other nodes. For example, the communication mechanism (CM) 230 can send and receive messages (e.g., packets of information) to other nodes in the network. The communication mechanism 230 can include a receiver for receiving messages from neighboring nodes and a transmitter for transmitting messages to neighboring nodes (i.e., nodes that are within range of the communication protocol utilized).

For example, the CM 230 can be a transceiver and associated software for implementing a short-range RF communication protocol (e.g., Bluetooth), a transceiver and associated software for implementing a wireless local area network (LAN) communication protocol (e.g., IEEE 802.11), or a transceiver and associated software for implementing a cellular communication protocol.

Each node also has the geographic position dependent routing (GPDR) mechanism 240 of the present invention. The GPDR mechanism 240 receives the GPD and messages from the CM 230 and based thereon determines whether the received message is intended for the current node. When it is determined that the received message is for the current node, the GPDR mechanism 240 forwards the message to a message processing application 250. The message processing application 250, can for example, be a voice communication application (e.g., for a cellular telephone) or a TCP/IP communication application (e.g., for access to the Internet, electronic mail applications, web access applications, etc.). The message processing application 250 can utilized the CM 230 to send messages to other nodes.

The GPDR mechanism 240 is now described in greater detail with reference to FIGS. 3-5 and can be implemented in hardware, firmware, software, or a combination thereof. For example, the GPDR mechanism 240 can be hard-wired into discrete circuit components or integrates as a functional block in an application specific integrated circuit (ASIC). Alternatively, the GPDR mechanism 240 can be implemented as software that executes on a processor. In a software implementation, the GPDR mechanism 240 can be integrated with the message processing application 250, integrated with communication protocol software in CM 230, or implemented separate from these applications.

Geographic Position Dependent Routing Mechanism 240

Figure 3:
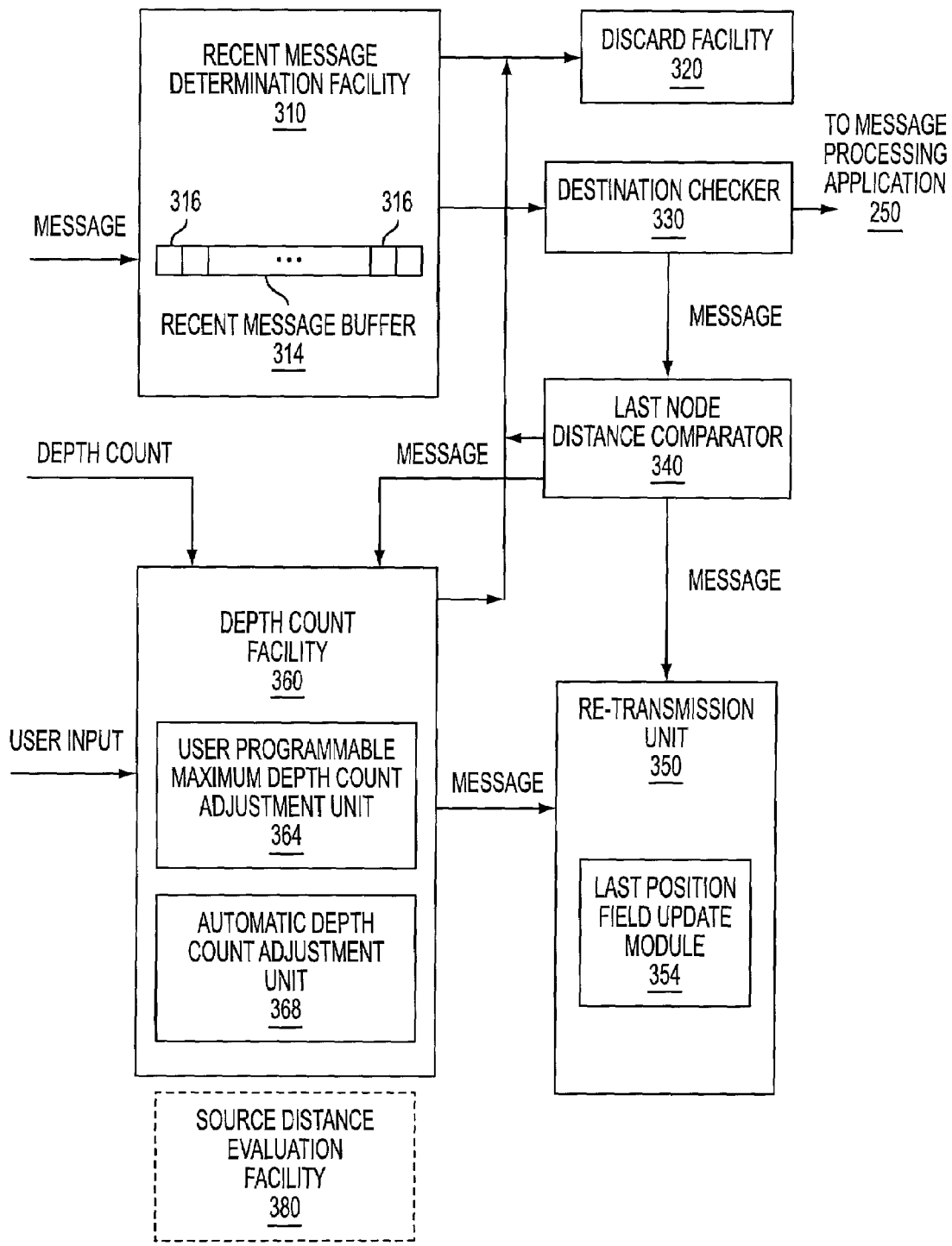
FIG. 3 is a block diagram illustrating in greater detail the geographic position dependent routing mechanism of FIG. 2 according to one embodiment of the present invention.

FIG. 3 is a block diagram that illustrates in greater detail the geographic position dependent routing (GPDR) mechanism 240 of FIG. 2. The GPDR mechanism 240 includes a recent message determination facility (RMDF) 310 for determining if the current received message has been received recently in the past. The recent message determination facility 310 includes a recent message buffer (RMB) 314 for storing a plurality of previous message containers 316. Each previous message container 316 includes selected fields of previous messages that can be compared with respective fields in the current received message to determine if the current message has been received recently. The operation of the recent message determination facility 310 is described in greater detail hereinafter with reference to FIG. 4 and FIG. 6.

The GPDR mechanism 240 also includes a discard facility 320 that is coupled to the RMDF 310 for discarding messages that the GPDR mechanism 240 has determined are 1) not intended for the current node, and 2) should not be re-transmitted or broadcast. For example, messages that the RMDF 310 determine have been received recently are sent to the discard facility 320 for disposal.

The GPDR mechanism 240 also includes a destination checker 330 that is coupled to the RMDF 310 for determining if the received message is for the current node. When the received message is for the current node, the destination checker 330 sends the message to the message processing application (MPA) 250.

The GPDR mechanism 240 also includes a last node comparator 340 that is coupled to the destination checker 330 for performing processing related to the last node (i.e., the node from which the current message has been received). Last node processing involves determining the distance from the last node to the destination node (herein referred to as the last node distance) and the distance from the current node to the destination node (herein referred to as the current node distance). Last node processing further involves comparing the last node distance with the current node distance to determine if the current node is closer or further from the destination node than the last node is from the destination. When the current node distance is more than the last node distance, the last node comparator 340 sends the current message to the discard facility 320 for disposal.

The GPDR mechanism 240 also includes a re-transmission unit 350 that is coupled to last node comparator 340 and a depth count facility 360 for re-transmitting (e.g., broadcasting) a message to other nodes in the network. When the last node comparator 340 determines that the current node distance is less than the last node distance, the last node comparator 340 sends the current message to re-transmission unit 350 for update and re-transmission. The re-transmission unit 350 includes a last position field update module for revising the message to add the position of the current node to a last position field before re-transmission.

The GPDR mechanism 240 also includes a depth count facility 360 that is coupled to last node comparator 340 for performing processing on the message related to depth count. Depth count processing involves comparing the depth count in the current message with a predetermined maximum depth count value. As described in greater detail hereinafter, the maximum depth count value can be programmed and updated by a user or automatically set and revise based on certain network conditions. When the current depth count is in a predetermined relationship with the maximum depth count, the message is sent to the re-transmission unit 350 for re-transmission. When the current depth count is not in a predetermined relationship with the maximum depth count, the message is sent to the discard facility 320 for disposal.

The depth count facility 360 includes a user-programmable depth count adjustment unit 364 for allowing a user to set parameters, such a maximum depth count. The depth count facility 360 also includes an automatic depth count adjustment facility 368 for dynamically adjusting the maximum depth count based on one or more network operating parameters (e.g., a time out error for a previously sent message, density of nodes in the local area, etc.).

The operation of the depth count facility 360, the user-programmable depth count adjustment unit 364, and the automatic depth count adjustment facility 368 are described in greater detail hereinafter with reference to FIG. 5 and FIG. 6.

Source Distance Evaluation Facility

The GPDR mechanism 240 can optionally includes a source distance evaluation facility 380 that is coupled to the depth count facility or the last node distance comparator 340 for performing processing related to the source node. Source node processing involves determining 1) the distance from the source node to the destination node (herein referred to as the source-destination distance) and the distance from the current node to the destination node (herein referred to as the current node distance). Moreover, source node processing involves comparing the source-destination distance with the current node distance to determine if the current node is closer or further from the destination node than the source node is from the destination node.

When the current node is closer to the destination node than the source node is from the destination node, the message is re-transmitted. Otherwise, when current node is further from the destination node than the source node is from the destination node, the message is sent to the discard facility 320 for disposal.

It is noted that the GPDR mechanism 240 does not require a neighborhood discovery process, thereby saving time and network bandwidth.

Recent Message Determination Facility

Figure 4:
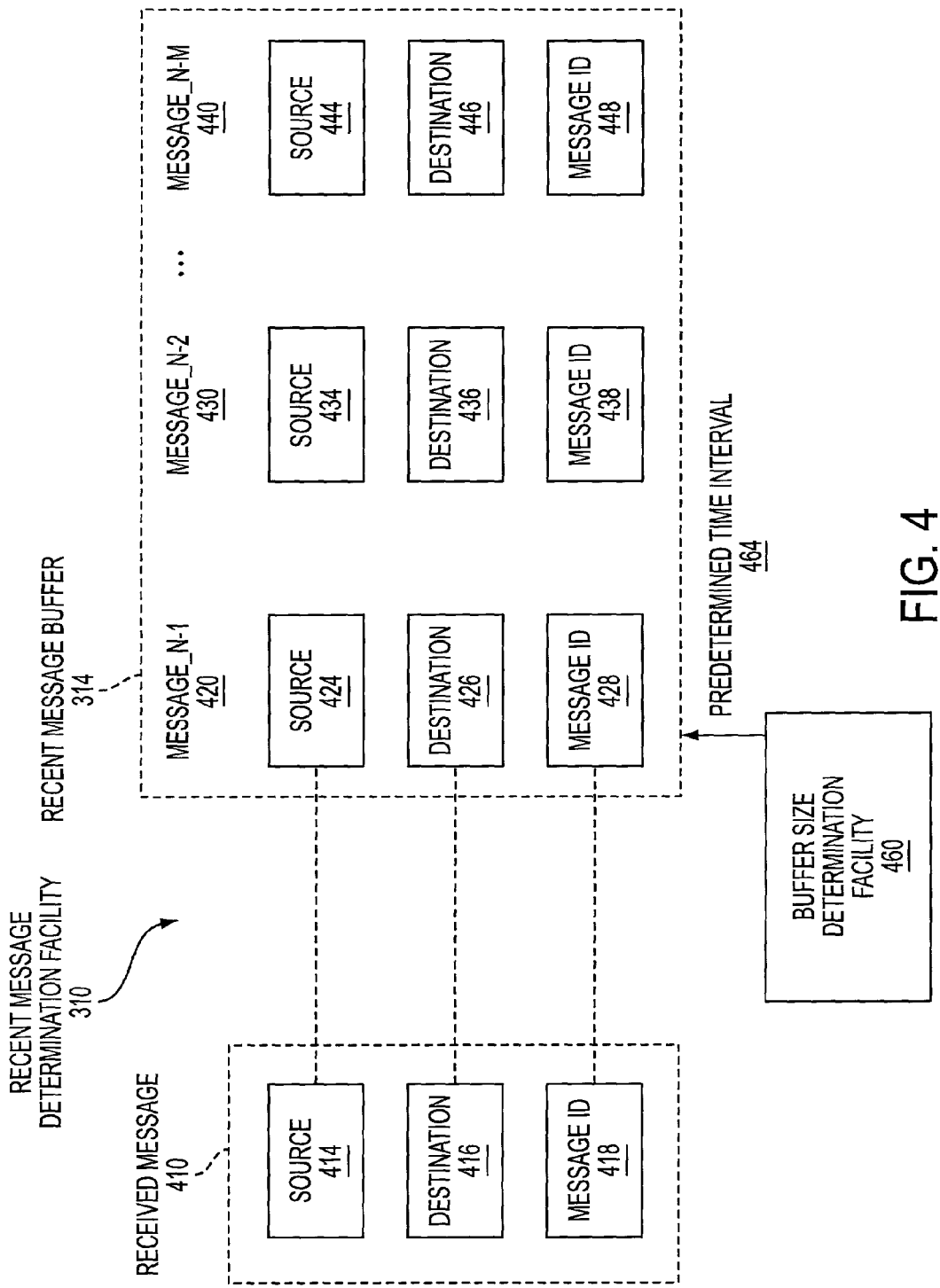
FIG. 4 is a block diagram illustrating in greater detail the recent message determination facility of FIG. 3 according to one embodiment of the present invention.

FIG. 4 is a block diagram illustrating in greater detail the recent message determination facility 310 of FIG. 3 according to one embodiment of the present invention. The recent message determination facility (RMDF) 310 compares selected fields in a received message 410 with associated fields in previous messages (e.g., messages 420, 430, 440). The selected fields in the received message 410 can be a SRC field 414, a DEST field 416, and a MSG ID 418.

Each of these fields 414, 416 and 418 are compared to corresponding fields for each of the previous messages (e.g., messages 420, 430, 440). As described earlier, the RMB 314 stores a plurality of previous message containers. When the current node is considered to be the Nth node, then the last node is denoted as the N-1 node (MSG_N-1). Similarly, the second to last or next to the last node is denoted as the N-2 node (MSG_N-2).

The processing for comparing the received message 410 with the last processed message 420 (MSG_N-1) involves: 1) comparing SRC 414 with SRC 424, 2) comparing DEST 416 with DEST 426, and 3) comparing MSG ID 418 with MSG ID 428. Similarly, the processing for comparing the received message 410 with the second to last processed message 430 (MSG_N-1) involves: 1) comparing SRC 414 with SRC 434, 2) comparing DEST 416 with DEST 436, and 3) comparing MSG ID 418 with MSG ID 438. Furthermore, the processing for comparing the received message 410 with the $M^{th}$ to last processed message 430 (MSG_N-1) involves: 1) comparing SRC 414 with SRC 444, 2) comparing DEST 416 with DEST 446, and 3) comparing MSG ID 418 with MSG ID 448. When any of the fields do not match, the message is forward to the next processing module. However, when all the fields match for a particular previous message, the message is discarded.

A buffer size determination facility 460 is provided to generate a predetermined time interval 464 that controls the number of previous messages that are stored in RMB 314. For example, when a longer time interval 464 is specified, more messages (i.e., previous messages processed in that time interval) are stored in the RMB 314.

Depth Count Facility

Figure 5:
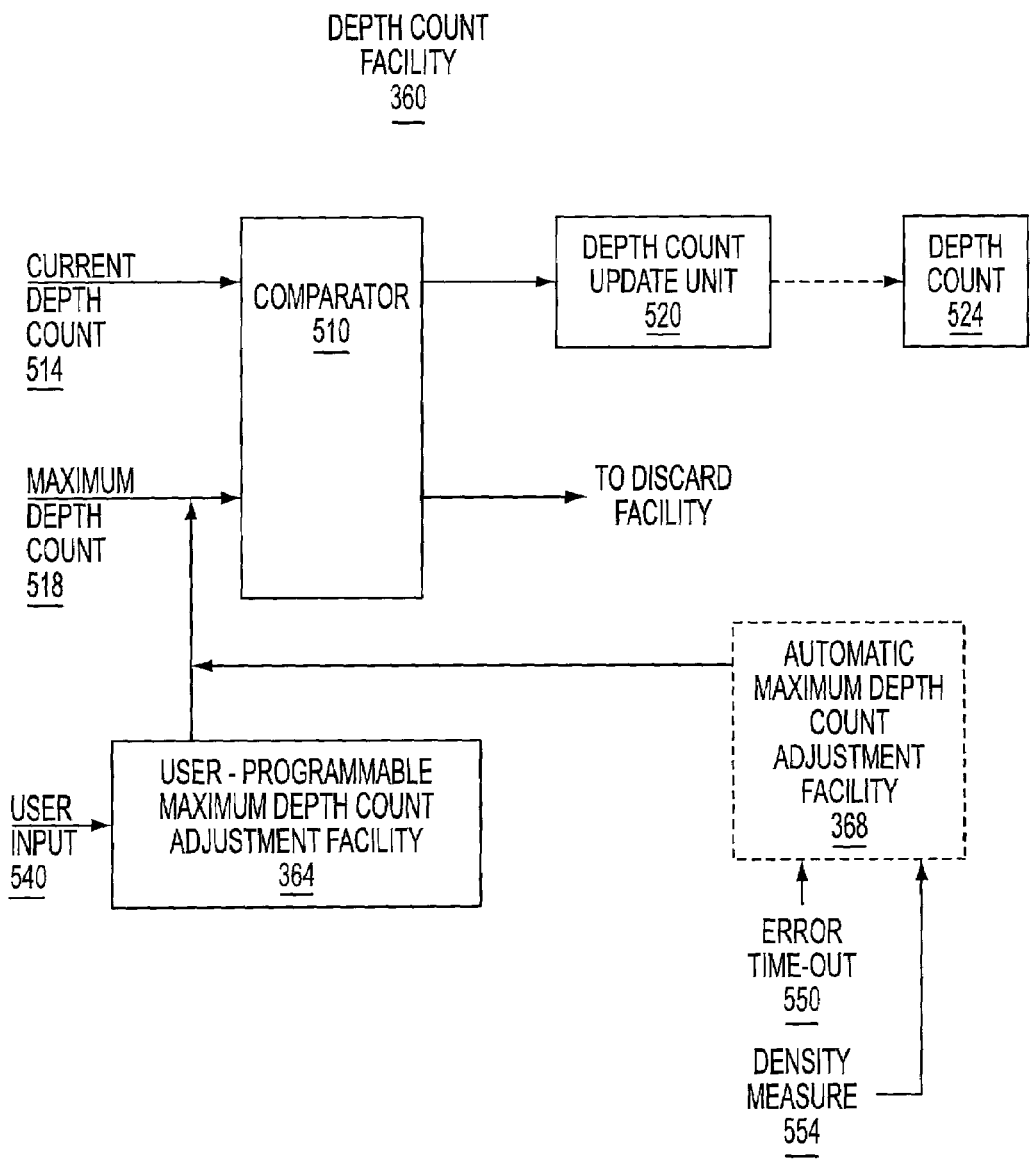
FIG. 5 is a block diagram illustrating in greater detail the depth count facility of FIG. 3 according to one embodiment of the present invention.

FIG. 5 is a block diagram illustrating in greater detail the depth count facility 360 of FIG. 3 according to one embodiment of the present invention. The depth count facility 360 includes a comparator 510 for receiving a current depth count 514 that is extracted from the depth field of a current message and a maximum depth count 518. Based on these inputs, the comparator 510 compares the current depth count 514 with the maximum depth count 518 to determine whether the current depth count 514 is in a predetermined relationship with the maximum depth count 518.

When the current depth count 514 is in a predetermined relationship with the maximum depth count 518 (e.g., the depth count less than the maximum depth count), the message is sent to a depth count update unit 520. The depth count update unit 520 revises the depth field 524 (e.g., decreasing the depth count by one).

When the current depth count 514 is not in a predetermined relationship with the maximum depth count 518 (e.g., the depth count is greater than the maximum depth count), the message is sent to the discard facility 320.

The depth count facility 360 includes a user-controlled maximum depth count adjustment facility 364 for receiving user input 540 and based thereon for adjusting the maximum depth count accordingly. The user-controlled maximum depth count adjustment facility 364 allows a user to flexibly determine a maximum depth count.

The depth count facility 360 includes an automatic maximum depth count adjustment facility 368 for automatically adjusting the maximum depth count based on parameters (e.g., error time out 550 and density measure 554.

Packet Processing

In this embodiment each node is equipped with an antenna for transmitting and receiving packets. However, those of ordinary skill in the art will readily appreciate that each node can be connected to other nodes with the use of wires or cables. In this regard, the nodes 110 in the network 100 can be coupled via a wireless link or through a physical connection medium (e.g., a cable).

Message Processing

FIG. 6 is a flowchart illustrating the processing steps performed by the GPDR mechanism of FIG. 2 (e.g., what happens between when a packet is received at a node to the time the packet is forwarded or not). In step 610, a determination is made whether a message has been received. If a message has not been received, the processing continues at step 610 to wait for the arrival of a message.

In step 620, a determination is made whether the current message has been encountered recently. For example, the determination of whether the current message has been encountered recently can utilize the destination field, the source field, and message identifier field. Specifically, the destination field, the source field, and message identifier field of previous messages can be stored in recent message buffer 314. When a message is received, the destination field, the source field, and message identifier field of the received message is compared to the destination field, the source field, and message identifier field corresponding to messages stored in the recent message buffer 314. When there is a match, the current message is discarded (634). Step 620 also prevents a message from being trapped in an endless loop. The recent message buffer 314 can store recent messages received in a predetermined time interval in the past. The predetermined time interval can be several seconds or several days depending on the application, amount of traffic on the network, amount of memory available at each node, etc. When the current message has not been encountered recently, processing proceeds to step 630.

In step 624, selected fields of the current message are stored into a storage (e.g., the recent message buffer 314) for future step 620 determinations. These fields can be, for example, the destination field, the source field, and message identifier field of the received message.

In step 630, a determination is made whether the current node is the destination of the message. In other words, a determination is made whether the message is intended for the current node.

When the current node is the destination of the message, in step 640 the message is processed (e.g., sent to a message processing application), and the processing returns to step 610.

When the current node is not the destination of the message, processing proceeds to step 650. In step 650, a determination is made whether the current node is closer in proximity to the destination node than the last node is from the destination node. When the current node is closer in proximity to the destination node than the last node is close to the destination node, then in step 660 update the message with the location of the current node (i.e., write the location of the current node in a last position field). In step 670, the updated message is transmitted (e.g., broadcast) to nodes that are in range.

When the current node is not closer in proximity to the destination node than the last node is close to the destination node, then in step 680 a determination is made whether the depth count is in a predetermined relationship with a maximum depth count. When the depth count is in a predetermined relationship with the maximum depth count, processing continues at step 660. When the depth count is not in a predetermined relationship with the maximum depth count (e.g., when the depth count has been exhausted), the message is discarded (processing step 634).

Optionally, an additional decision block can be inserted either before decision block 680 or after decision block 680. This decision block determines whether the current node is closer to the destination node than the source node is from the destination. When the current node is closer to the destination node than the source node is from the destination, proceeding to step 660. When the current node is further from the destination node than the source node is from the destination, then discarding the message (step 634).

Exemplary Message

Figure 7:
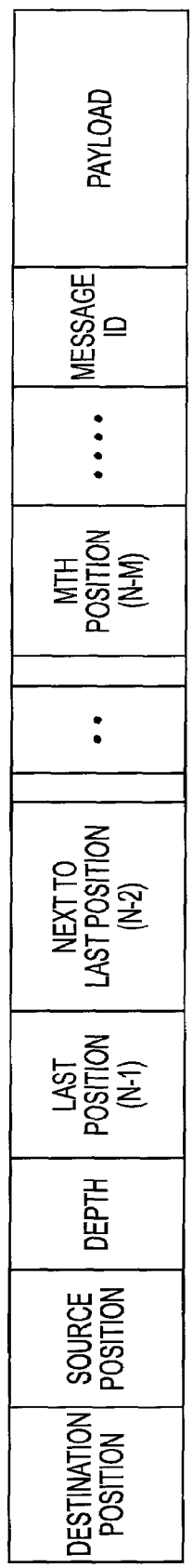
FIG. 7 illustrates an exemplary message for use by the geographic position dependent routing mechanism according to one embodiment of the present invention.

FIG. 7 is an exemplary message that includes source position information and destination position information. In one embodiment, the message includes the following plurality of fields: 1) a destination position field, 2) a source position field, a depth field, 3) one or more last position fields, 4) a message identifier (MSG ID) field, and 5) a payload.

The destination position field specifies the coordinates (e.g., GPS latitude, longitude, and altitude) of the destination node. It is noted that since the destination node can move and change its location, the destination position is not an absolute address for use in determining that a current node is the destination node. Instead, a field in the payload, such as a media access control (MAC) address in IEEE 802.11 compliant networks, is employed as an absolute address for determining whether a current node is a destination node.

The source position field specifies the coordinates (e.g., GPS) of the source node. The depth field specifies the number of hops or nodes a packet can travel past a closest node. A value of zero, for example, specifies that the next hop or node be closer to the destination node than the location of the current node. When a next node is closer to the destination node than the current node, the message is re-transmitted or forwarded. Otherwise, when there is no next node that is closer to the destination node than the current node, the packet is not transmitted.

A value of one, for example, specifies that the next hop (one hope) is not required to be closer to the destination node than the location of the current node. However, the next hop is required to be closer to the destination node than the previous node. A value of two, for example, specifies that the next two hops are not required to be closer to the destination node than the location of the current node. However, the third hop is required to be closer to the destination node than the previous node.

The depth count can be viewed as the amount of hops or nodes that can be further from the destination from a previous node before the packet is discarded. As described in greater detail hereinafter, the depth count is important to accommodate areas where the density or number of nodes is low.

Depth Count

The depth count is a parameter that limits that type (e.g., shape) and number of paths that can be utilized to reach a given destination. In general, as the depth count increases, the number of possible paths increases, thereby increasing the number of options for transmitting the message from the source node to the destination node. The depth count can be a system level parameter that is prescribed in a network protocol. Alternatively, the depth count can be a user-programmable value that can be changed by a user. For example, the depth count can be set to a default value of one. However, after a predetermined time has elapsed without receiving a response, the depth count can be automatically increased (e.g., incremented by one) and the packet re-sent with the revised depth count. It is noted that the user can manually increment or otherwise assign a revised value to the depth count depending on the performance of the network, density of other nodes in the area, etc.

In an alternative embodiment, a current depth count is maintained and a maximum depth count is provided. When the current depth count is less than or equal to the maximum depth count value, the message is re-transmitted. Otherwise, the message is discarded.

One or more last position fields are provided for specifying the coordinates of node where the last re-transmission of the packet occurred. The last position fields can be utilized to track the position of the previous nodes where the packet has traversed. It is noted that a last position field can include the locations of the source node. The number of last position fields can be selected by a network designer to suit a particular application. In a preferred embodiment, the number of last position fields is set to the expected depth count (e.g., depth count equal to two).

The message identifier (MSG ID) field specifies a unique identifier that is associated with the message. The message identifier can be utilized to remove duplicates of the message. Furthermore, the message identifier can be utilized to differentiate between two messages that may have similar traits so that different messages are not accidentally discarded by a current receiving node.

The payload includes the data being transmitted and fields associated with the transmission protocol.

One advantage of the routing method and system of the present invention is that the system does not require a neighborhood discovery process, thereby saving system resources. Another advantage of the routing method and system of the present invention is the provision of an intelligent routing mechanism that employs geographic position data of nodes in the network for more efficient routing. The routing method and system of the present invention is especially suitable for an ad hoc network, where one or more of the nodes of the network (e.g., mobile units) can change its location.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method for routing messages in an ad hoc network having a plurality of nodes, where each node has a location, where at least one node can change its location, the method comprising:
   a) receiving a message;
   b) determining whether the received message has been encountered recently;
   c) when the received message has been encountered recently, discarding the message;
   d) when the received message has not been encountered recently, determining whether the current node is the destination of the message;
   e) when the current node is the destination of the message, processing the message; and
   f) when the current node is not the destination of the message, selectively forwarding the message to another node in an intelligent manner that employs a geographic position data of the current node; wherein the step of when the current node is not the destination of the message, selectively forwarding the message to another node in an intelligent manner that employs the geographic position data of the current node includes:
      f_1) determining whether the current node is closer in proximity to the destination node than the last node is from the destination node;
      f_2) when the current node is closer in proximity to the destination node than the last node is close to the destination node, then updating the message with the location of the current node;
   writing the location of the current node in a last position field in the message; and
      f_3) forwarding the updated message to a next node in the network including transmitting the updated message in a broadcast fashion to nodes that are in communication range of the current node.

2. The method of claim 1 wherein the step of receiving a message includes
   a_1) determining whether a message has been received;
   a_2) when a message has not been received, the processing continues at step (a) to wait for the arrival of a message; and
   a_3) when a message has been received, proceeding to step (b).

3. The method of claim 1 wherein the step of determining whether the received message has been encountered recently includes
- b_1) determining whether the destination field of the received message matches with the destination field of previously received messages;
- b_2), determining whether the source field of the received message matches with the source field of previously received messages; and
- b_3) determining whether the message identifier field of the received message matches with the message identifier field of previously received messages.

4. The method of claim 1 wherein the step of determining whether the received message has been encountered recently includes
- b_1) storing the destination field, the source field, and message identifier field of the received message for use in future processing of step (b).

5. The method of claim 1 wherein the step of when the received message has not been encountered recently, determining whether the current node is the destination of the message includes
- d_1) comparing a unique address field in the received message with an address of the current node.

6. The method of claim 1 wherein the step of when the current node is not the destination of the message, selectively forwarding the message to another node in an intelligent manner that employs the geographic position data of the current node further includes
- f_4) when the current node is not closer in proximity to the destination node than the last node is close to the destination node, a determination is made whether the depth count is in a predetermined relationship with a maximum depth count;
- f_5) when the depth count is in a predetermined relationship with the maximum depth count, forwarding the message to a next node;
- f_6) when the depth count is not in a predetermined relationship with the maximum depth count, discarding the message.

7. The method of claim 6 wherein the step of when the depth count is in a predetermined relationship with the maximum depth count, forwarding the message to a next node includes
- updating the message with the location of current node;
- transmitting the message in a broadcast fashion; and
- proceeding to processing step (a).

8. The method of claim 1 wherein the step of when the current node is not the destination of the message, selectively forwarding the message to another node in an intelligent manner that employs the geographic position data of the current node further includes
- f_7) determining whether the current node is closer to the destination node than the source node is from the destination;
- f_8) when the current node is closer to the destination node than the source node is from the destination, forwarding the message to a next node; and
- f_9) when the current node is further from the destination node than the source node is from the destination, then discarding the message.

9. The method of claim 8 wherein the step of when the current node is closer to the destination node than the source node is from the destination, forwarding the message to a next node includes
updating the message with the location of current node; transmitting the message in a broadcast fashion; and proceeding to receiving the message.

10. The method of claim 1 wherein the step of determining whether the received message has been encountered recently includes utilizing one of the destination field, the source field, and the message identifier field of the received message to make the determination of whether the received message has been encountered recently.

11. A routing system comprising:
- a) a position determination module for determining the position of the current node;
- b) a communication mechanism for communicating messages with other nodes;
- c) a geographic position dependent routing mechanism coupled to the position determination module and communication mechanism for receiving messages, the position of the current node, and based thereon for one of transmitting the message and discarding the message; and
- d) a message processing application coupled to the geographic position dependent routing mechanism for receiving messages and processing the messages for a particular application that can include a cellular telephone communication application.

12. The routing system of claim 11 wherein the geographic position dependent routing mechanism further includes
a recent message determination facility for receiving a message and determining whether the received message has been encountered recently.

13. The routing system of claim 12 wherein each message includes a destination field, a source field, and a message identifier field; and
wherein the recent message determination facility further determines whether a destination field of the received message matches with the destination field of previously received messages; whether a source field of the received message matches with the source field of previously received messages; and whether a message identifier field of the received message matches with the message identifier field of previously received messages.

14. The routing system of claim 12 wherein the recent message determination facility further includes a recent message buffer for storing the destination field, the source field, and message identifier field of the received message for use in future processing.

15. The routing system of claim 12 wherein the geographic position dependent routing mechanism further includes
a destination checker coupled to the recent message determination facility for comparing a unique address field in the received message with an address of the current node to determine whether the current node is the destination of the received message.

16. The routing system of claim 15 wherein the geographic position dependent routing mechanism further includes
a last node distance comparator coupled to the destination checker for determining whether the current node is closer in proximity to the destination node than the last node is from the destination node; when the current node is closer in proximity to the destination node than the last node is close to the destination node, the last node distance comparator updates the message with the location of the current node and forwards the updated message to a next node in the network.

17. The routing system of claim 16 wherein the geographic position dependent routing mechanism further includes
a depth count facility coupled to the last node comparator for determining whether a depth count is in a predetermined relationship with a maximum depth count; when the depth count is in a predetermined relationship with the maximum depth count, the depth count facility forwards the message to a next node; and when the depth count is not in a predetermined relationship with the maximum depth count, depth count facility discards the message.

18. The routing system of claim 11 wherein the geographic position dependent routing mechanism further includes
a source distance evaluation facility for determining whether the current node is closer to the destination node than the source node is from the destination; when the current node is closer to the destination node than the source node is from the destination, the source distance evaluation facility forwards the message to a next node; and when the current node is further from the destination node than the source node is from the destination, the source distance evaluation facility discards the message.

* * * * *

UNITED STATES PATENT AND TRADEMARK OFFICE
CERTIFICATE OF CORRECTION

PATENT NO. : 7,307,978 B2
APPLICATION NO. : 09/847765
DATED : December 11, 2007
INVENTOR(S) : Greg Carlson It is certified that error appears in the above-identified patent and that said Letters Patent is hereby corrected as shown below:

Title page, item [56] Column 2 (Other Publications), Line 5, delete "network,1999" and insert -- network, 1999 --;

Title page, item [57] Column 2 (Abstract), Line 2, delete "are" and insert -- at --;

Column 11, Line 7, Claim 3, delete "b_2)," and insert -- b_2) --.

Signed and Sealed this

First Day of June, 2010

David J. Kappos
*Director of the United States Patent and Trademark Office*